US008694314B2

(12) United States Patent
Yoshioka et al.

(10) Patent No.: US 8,694,314 B2
(45) Date of Patent: Apr. 8, 2014

(54) VOICE AUTHENTICATION APPARATUS

(75) Inventors: Yasuo Yoshioka, Hamamatsu (JP);
Takehiko Kawahara, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 992 days.

(21) Appl. No.: 11/850,365

(22) Filed: Sep. 5, 2007

(65) Prior Publication Data

US 2008/0071535 A1 Mar. 20, 2008

(30) Foreign Application Priority Data

Sep. 14, 2006 (JP) ................................. 2006-249160

(51) Int. Cl.
*G10L 15/00* (2013.01)

(52) U.S. Cl.
USPC .......................................... 704/246; 704/233

(58) Field of Classification Search
USPC .......................................... 704/233, 273, 205
See application file for complete search history.

(56) References Cited

U.S. PATENT DOCUMENTS

| 6,006,175 | A | 12/1999 | Holzrichter | |
|---|---|---|---|---|
| 6,965,860 | B1 * | 11/2005 | Rees et al. | 704/227 |
| 7,277,853 | B1 * | 10/2007 | Bou-Ghazale et al. | 704/248 |
| 2002/0077813 | A1 * | 6/2002 | Erell | 704/233 |
| 2003/0033143 | A1 | 2/2003 | Aronowitz | |
| 2003/0200086 | A1 | 10/2003 | Kawazoe et al. | |
| 2003/0220791 | A1 | 11/2003 | Toyama | |
| 2004/0186724 | A1 | 9/2004 | Morin | |
| 2005/0080623 | A1 * | 4/2005 | Furui et al. | 704/233 |
| 2006/0120537 | A1 * | 6/2006 | Burnett et al. | 381/71.6 |
| 2007/0233483 | A1 * | 10/2007 | Kuppuswamy et al. | 704/247 |

FOREIGN PATENT DOCUMENTS

| JP | 10-055194 A | 2/1998 |
|---|---|---|
| JP | 2001-021309 | 1/2001 |
| JP | 2002-236665 A | 8/2002 |
| JP | 2003-248661 | 9/2003 |
| JP | 2003-308091 A | 10/2003 |
| JP | 2003-316389 A | 11/2003 |
| JP | 2004-109563 A | 4/2004 |
| TW | 521266 | 2/2003 |
| TW | I225640 | 12/2004 |
| TW | I242729 | 11/2005 |
| TW | 200627378 | 8/2006 |
| WO | WO 01/16937 A1 | 3/2001 |

OTHER PUBLICATIONS

European Search Report mailed Aug. 1, 2008, for EP Application No. 07115597.2, seven pages.

(Continued)

*Primary Examiner* — Douglas Godbold
*Assistant Examiner* — Mark Villena
(74) *Attorney, Agent, or Firm* — Morrison & Foerster LLP

(57) ABSTRACT

In a voice authentication apparatus, a characteristics analyzer analyzes characteristics of a sample noise which is generated around a subject while the subject generates a sample voice for authentication of the subject. A setting part sets a correction value according to the characteristics of the sample noise analyzed by the characteristics analyzer. A correction part corrects an index value, which indicates a degree of similarity between a feature quantity of a reference voice which has been previously registered and a feature quantity of the sample voice obtained from the subject, based on the set correction value. A determinator determines authenticity of the subject by comparing the corrected index value with a predetermined threshold value.

13 Claims, 4 Drawing Sheets

(56) References Cited

OTHER PUBLICATIONS

Taiwanese Office Action mailed Aug. 26, 2010, for TW Patent Application No. 096131267, with English Translation, seven pages.
Taiwanese Search Report mailed Aug. 26, 2010, for TW Patent Application No. 096131267, with English Translation, four pages.
Notice of Reason for Rejection mailed Dec. 22, 2011, for JP Patent Application No. 2006-249160, with English Translation, six pages.
Notice of Reason for Rejection mailed Aug. 14, 2012, for JP Patent Application No. 2006-249160, with English Translation, five pages.

* cited by examiner

VOICE AUTHENTICATION APPARATUS

BACKGROUND OF THE INVENTION

1. Technical Field of the Invention

The present invention relates to an authentication technology of an individual voice.

2. Description of the Related Art

A conventional voice authentication technology has been suggested, which determines the authenticity of a person to be authenticated (hereinafter referred to as a "subject") by comparing, with a threshold, the distance between a feature quantity of a voice previously obtained from an authorized user (hereinafter referred to as a "reference voice" or "registration voice") and a feature quantity of a voice obtained from the subject (hereinafter referred to as a "sample voice" or "authentication voice"). Patent Reference Japanese Patent Application Publication No. 2003-248661 describes a configuration in which the threshold is changed according to the purpose of authentication or according to a required accuracy level of authentication.

FIG. 8 is a graph used to estimate voice authentication. A False Rejection Rate (FRR) in FIG. 8 means the probability (user rejection rate) that the authenticity of a subject will be rejected during authentication even though the subject is an authorized user, and a False Acceptance Rate (FAR) means the probability (stranger acceptance rate) that the authenticity of a subject will be accepted during authentication even though the subject is not an authorized user. As can be seen from FIG. 8, if the threshold used in authentication is set to a value "a" in FIG. 8, the probability of rejecting unauthorized subjects is maintained at a sufficiently high level while the probability of rejecting the authorized user is sufficiently reduced.

However, the distance between the authentication voice and the registration voice changes according to an ambient sound (hereinafter, referred to as "sample noise" or "authentication noise") generated during authentication since the authentication noise affects the characteristics of the authentication voice. Accordingly, the curve of each of the FRR and the FAR in FIG. 8 moves parallel to the horizontal axis (distance) according to the characteristics of the authentication noise. For example, if the FAR shown by a solid line in FIG. 8 is changed to a dashed line L1, then the probability of erroneously accepting the authenticity of a stranger is increased (i.e., the accuracy level of authentication is lowered) and, if the FRR in FIG. 8 is changed to a dashed line L2, then the probability of rejecting the authenticity of the authorized user is increased (i.e., the convenience of authentication is lowered). That is, the conventional voice authentication has a problem in that the balance between the accuracy of authentication and the convenience of authentication is disrupted according to the characteristics of the authentication noise.

This problem cannot be solved even by changing the threshold according to the purpose of authentication or the required accuracy level as in Patent Reference Japanese Patent Application Publication No. 2003-248661. This problem is more serious when authentication is performed with a portable electronic device represented by a mobile phone since the characteristics of authentication noise are changed in various ways according to the use environment of the electronic device.

SUMMARY OF THE INVENTION

The present invention has been made in view of such circumstances and it is an object of the present invention to solve the problem in maintaining the balance between the accuracy of authentication and the convenience of authentication, regardless of sample noise.

In order to solve the above problems, a voice authentication apparatus according to one aspect of the present invention comprises a characteristics analysis part that analyzes characteristics of a sample noise or authentication noise which is generated around a subject while the subject generates a sample voice or authentication voice for authentication of the subject; a first setting part (for example, a setter 51 in FIG. 1) that sets a first correction value (for example, a correction value Aa in FIG. 1) according to the characteristics of the authentication noise analyzed by the characteristics analysis part; a correction part that corrects an index value (for example, a distance D0 in FIG. 1), which indicates a degree of similarity between a feature quantity of a reference voice or registration voice which has been previously registered and a feature quantity of the authentication voice obtained from the subject, based on the first correction value set by the first setting part; and a determinator that determines authenticity of the subject by comparing the index value corrected by the correction part with a predetermined threshold value.

According to this aspect, the index value indicating whether or not the registration voice is similar to the authentication voice is compared with the predetermined threshold value after the index value is corrected according to the characteristics of the authentication noise, thereby maintaining the balance between the convenience of authentication and the accuracy of authentication, regardless of the authentication noise. The predetermined threshold value may be either a fixed value or a variable value.

In a preferred embodiment of the present invention, the first setting part determines the first correction value according to both the authentication noise and a level ratio between the registration voice and the registration noise (for example, a level ratio EN_SN in FIG. 4) which is generated during registration of the registration voice such that the first correction value is set as a difference between the predetermined threshold value and a variable (for example, a threshold TH in FIG. 4) which is determined in association with the characteristics of the authentication noise and the level ratio between the registration voice and the registration noise.

For example, the first setting part sets the first correction value as a difference between the predetermined threshold value and a variable which varies with the level ratio between the registration voice and the registration noise along a line or curve corresponding to the characteristics of the authentication noise.

More specifically, the first setting part sets the first correction value according to both the level ratio between the registration voice and the registration noise and the characteristics of the authentication noise which is given as a level ratio difference (for example, a level ratio difference DIF_SN1~DIF_SN3 in FIG. 4) between the level ratio between the registration voice and the registration noise and a level ratio (for example, a level ratio V_SN) between the authentication voice and the authentication noise.

This embodiment can maintain the balance between the convenience of authentication and the accuracy of authentication through simple processes, regardless of the characteristics of the registration noise or the authentication noise. The first setting part may set the first correction value based on a table that defines a relation of the first correction value with the level ratio between the registration voice and the registration noise and the characteristics of the authentication noise (more specifically, a level ratio difference between the level ratio between the registration voice and the registration noise and the level ratio between the authentication voice and the authentication noise) and may also set the first correction value through computation using an equation representing the relation between such values. The contents of the table or the equation may be changed appropriately, for example according to an instruction from the user.

The voice authentication apparatus according to an embodiment of the present invention further comprises a second setting part (for example, a setter 52 in FIG. 1) that sets a second correction value (for example, a correction value Ab in FIG. 1) according to a difference between the authentication noise and the registration noise (for example, a correlation value NOISE_DIF in FIG. 6), wherein the correction part corrects the index value according to the first and second correction values.

According to this embodiment, even when an actual correlation between the registration noise (i.e., reference noise) and the authentication noise (i.e., sample noise) during actual authentication is different from an original correlation between the registration noise and the authentication noise assumed when the relation of the first correction value with the registration noise and the registration voice is determined, the index value is corrected based on the second correction value according to the difference between the actual authentication noise and the registration noise, thereby effectively maintaining the balance between the convenience of authentication and the accuracy of authentication. The second setting part may set the second correction value based on a table that defines a relation of the second correction value with the difference between the authentication noise and the registration noise and may also set the second correction value through computation using an equation representing the relation. The contents of the table or the equation may be changed appropriately, for example according to an instruction from the user.

The voice authentication apparatus according to an embodiment of the present invention further comprises a third setting part (for example, a setter 53 in FIG. 1) that sets a third correction value (for example, a correction value Ac in FIG. 1) according to a duration of the authentication voice, i.e., sample voice or the registration voice, i.e., reference voice (for example, a speech length EN_SPEECH_LEN or V_SPEECH_LEN in FIG. 7), wherein the correction part corrects the index value according to the first and third correction values.

According to this embodiment, even when a speech length (or duration) of the registration voice or the authentication voice is different from that assumed when the relation of the first correction value with the registration noise and the registration voice is determined, the index value is corrected based on the third correction value according to the authentication voice or the registration voice, thereby effectively maintaining the balance between the convenience of authentication and the accuracy of authentication. The third setting part may set the third correction value based on a table that defines a relation between the third correction value and the duration of the authentication voice or the registration voice, and may also set the third correction value through computation using an equation representing the relation. The contents of the table or the equation may be changed appropriately, for example according to an instruction from the user.

The parameters, which are used as a basis for determining the correction values used to correct the index value, are not limited to the duration of the authentication voice or registration voice and the difference between the authentication noise and the registration noise. For example, the voice authentication apparatus may further comprise setting part that sets the correction values according to the ratio between the durations of voiced and unvoiced sounds included in the registration voice or the authentication voice, or setting part that sets the correction values according to the number of syllables of the registration voice or the authentication voice. A configuration in which the correction values are determined according to a table or equation as described above or a configuration in which the contents of the table or the equation are variable is employed in any of these embodiments.

The present invention is also specified as a voice authentication method to control the voice authentication apparatus according to each of the above embodiments. A voice authentication method according to an embodiment of the present invention comprises analyzing characteristics of an authentication noise which is generated around a subject while the subject generates an authentication voice for authentication of the subject; setting a correction value according to the analyzed characteristics of the authentication noise; correcting an index value, which indicates a degree of similarity between a feature quantity of a registration voice which has been previously registered and a feature quantity of the authentication voice obtained from the subject, based on the set correction value; and determining authenticity of the subject by comparing the corrected index value with a predetermined threshold value. This method achieves the same operations and advantages as those of the voice authentication apparatus according to the present invention.

The voice authentication apparatus according to each of the above embodiments is implemented by hardware (electronic circuitry) such as a Digital Signal Processor (DSP) dedicated to each process and is also implemented through cooperation between a program and a general-purpose processing unit such as a Central Processing Unit (CPU). A program according to the present invention causes a computer to perform a characteristics analysis process to analyze characteristics of an authentication noise which is generated around a subject while the subject generates a sample voice for authentication of the subject; a setting process to set a correction value according to the characteristics of the authentication noise analyzed in the characteristics analysis process; a correction process to correct an index value, which indicates a degree of similarity between a feature quantity of the registration voice which has been previously registered and a feature quantity of the authentication voice obtained from the subject, based on the correction value set in the setting process; and a determination process to determine authenticity of the subject by comparing the corrected index value with a predetermined threshold value. This program also achieves the same operations and advantages as those of the voice authentication apparatus according to each of the above embodiments. The program of the present invention is provided to a user in a form stored in a machine readable medium or a portable recording medium such as a CD-ROM and then installed on the computer, and is also provided from a server apparatus in a distributed manner over a network and then installed on the computer.

DETAILED DESCRIPTION OF THE INVENTION

<A: Configuration of Voice Authentication Apparatus>

Figure 1:
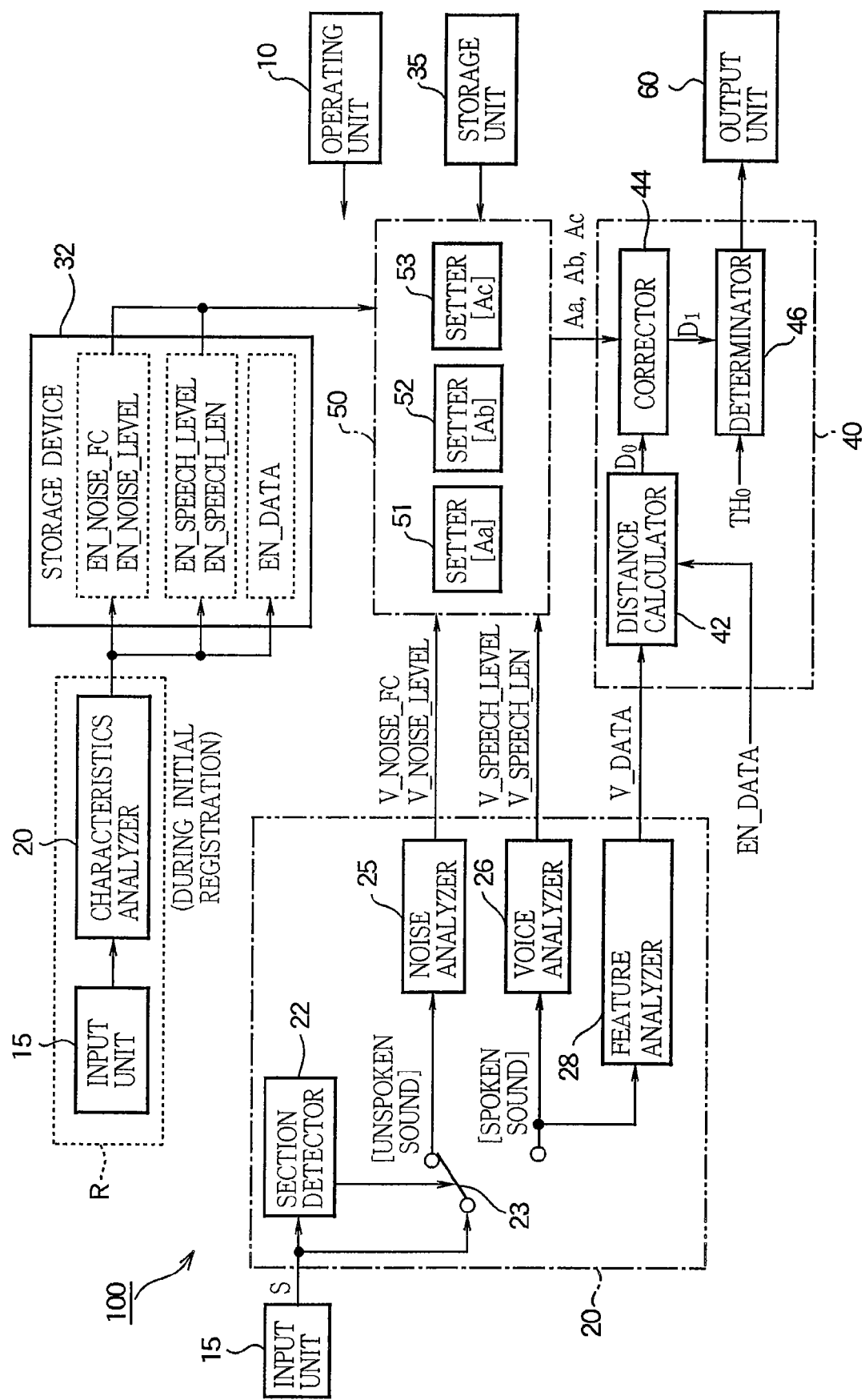
FIG. 1 is a block diagram illustrating the configuration of a voice authentication apparatus according to one embodiment of the present invention.

FIG. 1 is a block diagram illustrating the configuration of a voice authentication apparatus according to an embodiment of the present invention. The voice authentication apparatus 100 is a device that determines the authenticity of a subject (i.e., determines whether or not the subject is a regular user that has been previously registered) based on a voice generated when s/he speaks a specific word(s). The voice authentication apparatus 100 is installed in a variety of electronic devices such as a mobile phone or an information processing device. A characteristics analyzer 20, an authenticator 40, or a correction value controller 50 shown in FIG. 1 may each be implemented, for example, as a program executed by a processing unit such as a CPU and may also be implemented by a hardware circuit such as a DSP. A storage unit 35 may contain a machine readable medium containing the program.

Operations of the voice authentication apparatus 100 are divided into initial registration and authentication. The initial registration is an operation to register a voice (registration voice) spoken by the authorized user before authentication. The authentication is an operation to determine the authenticity of a subject by contrasting the registration voice with a voice (authentication voice) spoken by the subject. An operating unit 10 includes a plurality of operators that are manipulated by the user. The user can instruct the voice authentication apparatus 100 to start initial registration or authentication by appropriately manipulating the operating unit 10.

An input unit 15 and the characteristics analyzer 20 in FIG. 1 are used to detect characteristics of an authentication voice or ambient noise (authentication noise) of the voice authentication apparatus 100 when authentication is performed and are used to detect characteristics of a registration voice or ambient noise (registration noise) of the voice authentication apparatus 100 when initial registration is performed as shown by a dashed line R in FIG. 1.

An input unit 14 and the characteristics analyzer 20 in FIG. 1 are used to detect characteristics of an authentication voice or ambient noise (authentication noise) of the voice authentication apparatus 100 when authentication is performed and are used to detect characteristics of a registration voice or ambient noise (registration noise) of the voice authentication apparatus 100 when initial registration is performed as shown by a dashed line R in FIG. 1.

Figure 2:
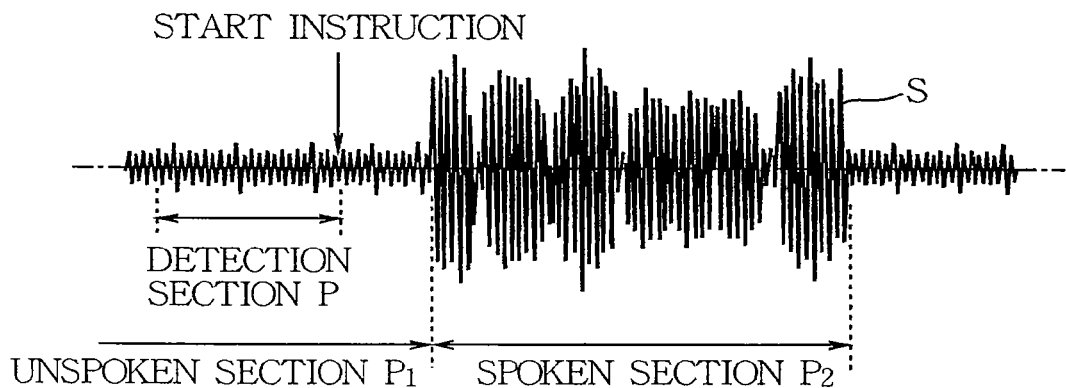
FIG. 2 is a waveform diagram of a sound signal generated by an input unit.

The input unit 15 is a sound collector that generates a sound signal S according to an ambient sound (voice and noise). As illustrated in FIG. 2, the sound signal S is divided into an unspoken section P1 and a spoken section P2. The spoken section P2 is a section in which an authorized user speaks a registration voice during initial registration or a section in which a subject speaks an authentication voice during authentication. On the other hand, the unspoken section P1 is a section in which no registration or authentication voice is spoken. Since a variety of noise may be generated in environments in which the voice authentication apparatus 100 is installed, the unspoken section P1 is not completely silent (i.e., the amplitude of the sound signal S is not zero in the unspoken section P1) and the input unit 15 collects registration noise or authentication noise in the unspoken section P1.

The sound signal S generated by the input unit 15 is provided to the characteristics analyzer 20 of FIG. 1. The characteristics analyzer 20 is a part for analyzing the sound collected by the input unit 15. The characteristics analyzer 20 includes a section detector 22, a switch 23, a noise analyzer 25, a voice analyzer 26, and a feature analyzer 28. The section detector 22 distinguishes between the unspoken section P1 and the spoken section P2. For example, the section detector 22 detects, as the boundary between the unspoken section P1 and the spoken section P2, the timing when the amplitude of the sound signal S discontinuously increases or decreases. A variety of known technologies may be employed to distinguish between the unspoken section P1 and the spoken section P2.

The switch 23 is a part for switching the supply destination of the sound signal S generated by the input unit 15. This allows a part of the sound signal S, which the section detector 22 identifies as the unspoken section P1, to be provided to the noise analyzer 25 and allows a part of the sound signal S, which the section detector 22 identifies as the spoken section P2, to be provided to the voice analyzer 26 and the feature analyzer 28.

The noise analyzer 25 is a part for analyzing characteristics of registration noise or authentication noise based on the sound signal S in the unspoken section P1. The noise analyzer 25 in this embodiment analyzes characteristics of the sound signal S periodically in the unspoken section P1. When the operating unit 10 is manipulated to instruct the voice authentication apparatus 100 to start initial registration or authentication, the noise analyzer 25 determines that analyzed characteristics of a section P (referred to as a detection section), which starts at a predetermined time before the instructed time and ends at the instructed time, are characteristics of registration noise or authentication noise as shown in FIG. 2. In the following description, items associated with registration noise or a registration voice are denoted by a symbol including "EN" which is short for "enroll" and items associated with authentication noise or an authentication voice are denoted by a symbol including "V" which is short for "verify".

As shown in FIG. 1, the noise analyzer 25 in this embodiment calculates frequency characteristics EN_NOISE_FC and a noise level EN_NOISE_LEVEL of registration noise when initial registration is performed and calculates frequency characteristics V_NOISE_FC and a noise level V_NOISE_LEVEL of authentication noise when authentication is performed. Each of the noise levels EN_NOISE_LEVEL and V_NOISE_LEVEL is an average of the magnitudes (sound pressures) of components included in a specific frequency band among the components of the sound signal S in the detection section P in the unspoken section P1. The frequency characteristics EN_NOISE_FC or V_NOISE_FC are information representing the respective magnitudes of the components of a plurality of frequency bands into which the sound signal S in the detection section P is divided. Accordingly, the noise analyzer 25 includes, for example, a plurality of bandpass filters (a filter bank) with different passbands. The information of the frequency characteristics EN_NOISE_FC and V_NOISE_FC only needs to reflect characteristics of registration noise or authentication noise. For example, the noise analyzer 25 may be a part for calculating a frequency spectrum as the frequency characteristics EN_NOISE_FC and V_NOISE_FC through frequency analysis such as Fast Fourier Transform (FFT).

The voice analyzer 26 analyzes characteristics of a registration voice or an authentication voice based on the sound signal S in the spoken section P2. The voice analyzer 26 in this embodiment calculates a speech level EN_SPEECH_LEVEL and a speech length (or duration) EN_SPEECH_LEN of a registration voice when initial registration is performed and calculates a speech level V_SPEECH_LEVEL and a speech length V_SPEECH_LEN of an authentication voice when authentication is performed. Each of the speech levels EN_SPEECH_LEVEL and V_SPEECH_LEVEL is an average of the magnitudes of components included in a specific frequency band in the sound signal S in the spoken section P2. Each of the speech lengths EN_SPEECH_LEN and V_SPEECH_LEN represents the duration of the spoken section P2 (i.e., the period of time during which speech continues). The period from the time when the amplitude of the sound signal S rapidly increases (which corresponds to the start of the spoken section P2) to the time when the amplitude of the sound signal S rapidly decreases (which corresponds to the end of the spoken section P2) is detected as the speech length EN_SPEECH_LEN and V_SPEECH_LEN.

The feature analyzer 28 is a part for analyzing features of a registration voice or an authentication voice. The feature analyzer 28 in this embodiment calculates a feature quantity EN_DATA of a registration voice when initial registration is performed and calculates a feature quantity V_DATA of an authentication voice when authentication is performed. Each of the feature quantities EN_DATA and V_DATA is a time-series of vectors of a cepstrum calculated from the sound signal S in the spoken section P2. Accordingly, a part for performing a variety of calculations including frequency analysis (for example, an FFT process) is preferably used as the feature analyzer 28.

A storage device 32 is a part for storing a variety of information used in authentication. For example, as shown in FIG. 1, the storage device 32 stores, as an authentication dictionary, a variety of information that the characteristics analyzer 20 specifies for registration voices and registration noise. More specifically, frequency characteristics EN_NOISE_FC and a noise level EN_NOISE_LEVEL specified by the noise analyzer 25, a speech level EN_SPEECH_LEVEL and a speech length EN_SPEECH_LEN specified by the voice analyzer 26, and a feature quantity EN_DATA specified by the feature analyzer 28 are stored in the storage device 32 before Authentication is performed. The storage device 32 may be a device fixed to the voice authentication apparatus 100 and may also be a portable device (memory) that is detachably attachable to the voice authentication apparatus 100.

The authenticator 40 is a part for determining the authenticity of a subject by contrasting an authentication voice with the registration voice. The authenticator 40 includes a distance calculator 42, a corrector 44, and a determinator 46. The distance calculator 42 calculates the distance D0 between a feature quantity EN_DATA stored in the storage device 32 and a feature quantity V_DATA that the feature analyzer 28 generates for the authentication voice. The distance calculator 42 calculates the distance D0 using a variety of pattern matching technologies such as DP matching which calculates a normalized distance between the vector sequences of the feature quantities EN_DATA and V_DATA. As the distance D0 decreases, the authentication voice is more similar to the registration voice (i.e., the subject is more likely to be an authorized user).

The corrector 44 is a part for correcting the distance D0 calculated by the distance calculator 42 based on correction values A (Aa, Ab, and Ac). The corrector 44 in this embodiment calculates a corrected distance D1 by subtracting each correction value Aa, Ab, and Ac set by the correction value controller 50 from the distance D0.

The determinator 46 determines the authenticity of the subject by comparing the distance D1 corrected by the corrector 44 with a threshold TH0. More specifically, the determinator 46 accepts the authenticity of the subject if the distance D1 is lower than the threshold TH0 (i.e., if the registration voice is similar to the authentication voice) and rejects the authenticity of the subject if the distance D1 is higher than the threshold TH0 (i.e., if the registration voice is different from the authentication voice). The threshold TH0 is a predetermined, fixed value. The determined result of the determinator 46 is output through the output unit 60. For example, a display that outputs an image indicating the authentication result or an audio output device that outputs a sound indicating the authentication result is preferably used as the output unit 60.

The correction value controller 50 is a part for setting correction values A (Aa, Ab, and Ac) that are used in correction by the corrector 44. The correction value controller 50 includes setters 51, 52, and 53. The setter 51 sets the correction value Aa based on information that the characteristics analyzer 20 generates during initial registration and authentication. The setter 52 sets the correction value Ab according to the difference between the characteristics of authentication noise and the characteristics of registration noise. The setter 53 sets the correction value Ac according to the speech length EN_SPEECH_LEN during initial registration. Details of the operation of the correction value controller 50 will be described later. A storage unit 35 in FIG. 1 stores tables that the correction value controller 50 uses to set the correction values A. A specific storage area in the storage device 32 may be used as the storage unit 35.

<B: Operation of Voice Authentication Apparatus>

The detailed operation of the voice authentication apparatus 100 will now be described, focusing on processes of the correction value controller 50 to set the correction values Aa, Ab, and Ac during authentication. The correction value controller 50 performs the processes of FIG. 3 each time authentication becomes necessary. Examples of the time when authentication is necessary include the time when an electronic device including the voice authentication apparatus 100 starts operation as power is applied and the time when the electronic device starts a specific operation (for example, an operation to access specific information). When authentication is initiated, a subject speaks a specific word(s) into the input unit 15 after issuing a speech start instruction by manipulating the operating unit 10. The noise analyzer 25 specifies frequency characteristics V_NOISE_FC and a noise level V_NOISE_LEVEL from a sound signal S in a detection section P that ends at the time when the operating unit 10 is manipulated and specifies a speech level V_SPEECH_LEVEL and a speech length V_SPEECH_LEN from the sound signal S in a spoken section P2 subsequent to the detection section P.

Figure 3:
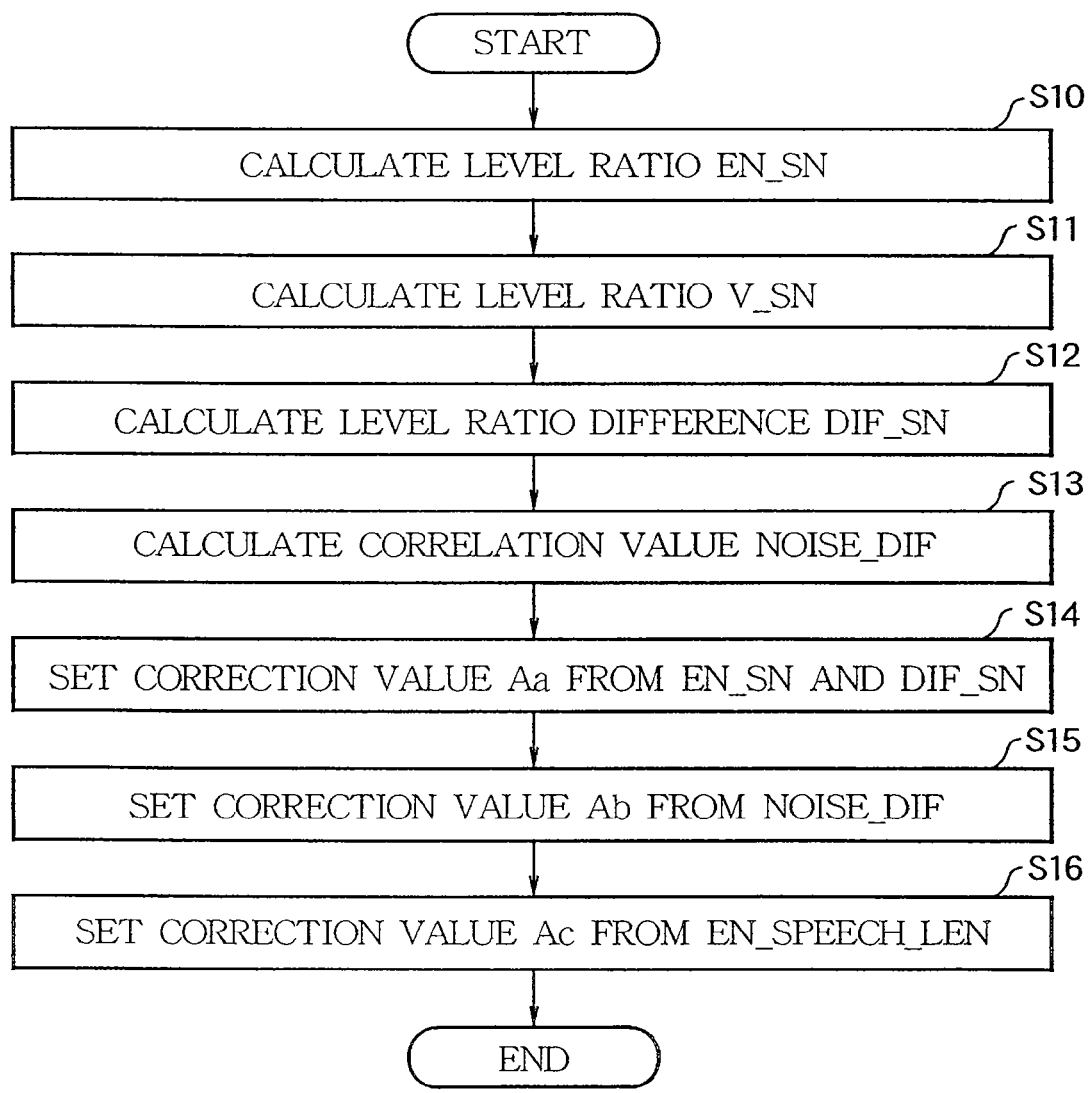
FIG. 3 is a flow chart illustrating a procedure performed by a correction value controller.

As shown in FIG. 3, the correction value controller 50 calculates the level ratio EN_SN between the registration voice and the registration noise (step S10). The level ratio EN_SN is the ratio between the speech level EN_SPEECH_LEVEL stored in the storage device 32 and the noise level EN_NOISE_LEVEL. For example, the level ratio EN_SN is calculated using Equation (1).

$$EN\_SN = \log(EN\_SPEECH\_LEVEL/EN\_NOISE\_LEVEL) \quad (1)$$

Then, the correction value controller 50 calculates the level ratio V_SN between the authentication voice and the authentication noise (step S11). The level ratio V_SN is the ratio between the noise level V_NOISE_LEVEL provided from the noise analyzer 25 and the speech level V_SPEECH_LEVEL provided from the voice analyzer 26. Similar to the level ratio EN_SN, the level ratio V_SN is calculated using Equation (2).

$$V\_SN = \log(V\_SPEECH\_LEVEL/V\_NOISE\_LEVEL) \quad (2)$$

Next, at step S12, the correction value controller 50 calculates the difference DIF_SN between the level ratio EN_SN in initial registration calculated at step S10 and the level ratio V_SN in authentication calculated at step S11 (DIF_SN=V_SN−EN_SN). In the following, the difference DIF_SN will be referred to as a "level ratio difference". The correction value controller 50 calculates a correlation value NOISE_DIF representing a correlation between the characteristics of the registration noise and the characteristics of the authentication noise (step S13). Here, the correlation is, for example, whether or not respective spectrum shapes of the registration noise and the authentication noise are similar. The correlation value NOISE_DIF is calculated, for example using Equation (3).

$$NOISE\_DIF = \frac{\sum_{i=M}^{L}(EN\_MAG(i) - EN\_MAG\_AVE)(V\_MAG(i) - V\_MAG\_AVE)}{\sqrt{\sum_{i=M}^{L}(EN\_MAG(i) - EN\_MAG\_AVE)^2}\sqrt{\sum_{i=M}^{L}(V\_MAG(i) - V\_MAG\_AVE)^2}} \quad (3)$$

A value EN_MAG(i) in Equation (3) is the magnitude of the registration noise in a frequency band, specified by a variable i, among a plurality of frequency bands and a value EN_MAG_AVG, which is subtracted from the value EN_MAG(i), is the average of the magnitudes of the registration noise in the frequency band specified by the variable i. Similarly, a value V_MAG(i) in Equation (3) is the magnitude of the authentication noise in a frequency band specified by a variable i and a value V_MAG_AVG, which is subtracted from the value V_MAG(i), is the average of the magnitudes of the authentication noise in the frequency band. Accordingly, the correction value NOISE_DIF is 1 if the registration noise exactly matches the authentication noise and decreases (−1≤NOISE_DIF≤1) as the difference between the characteristics of the two noises increases.

Then, the setter 51 of the correction value controller 50 sets a correction value Aa based on the level ratio EN_SN calculated at step S10 and the level ratio difference DIF_SN calculated at step S12 (step S14). Relations of correction value Aa with the level ratio EN_SN and the level ratio difference DIF_SN are determined in the following manner.

Figure 4:
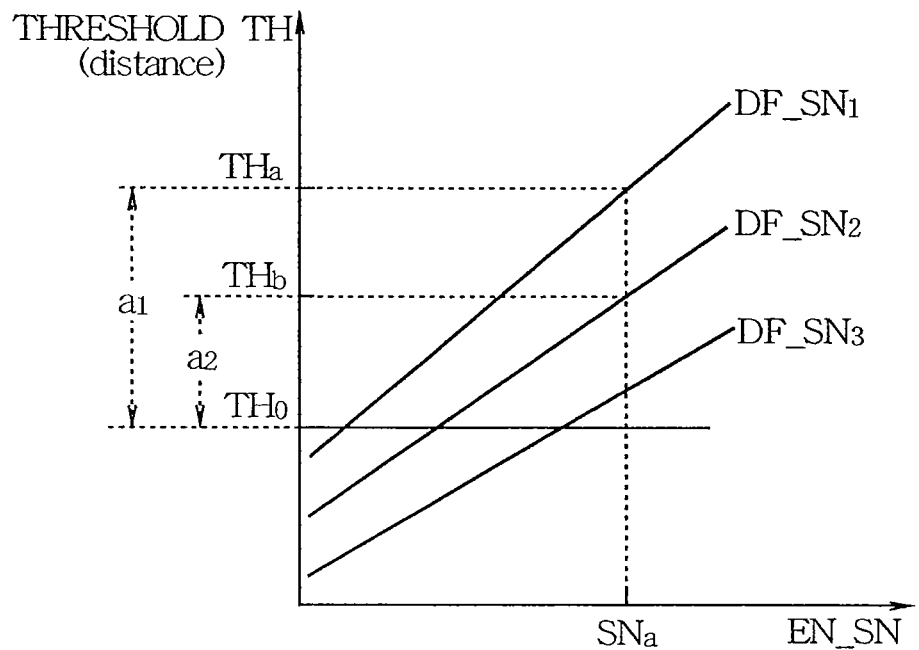
FIG. 4 is a graph illustrating the relations of a correction value Aa with a level ratio EN_SN and a level ratio difference DIF_SN.

First, we consider the case where the authenticity of a subject is determined according to whether the distance D0 calculated by the distance calculator 42 is greater or smaller than the threshold TH. By conducting tests, the inventor of this application has found that the threshold TH for maintaining the accuracy of authentication at a high level satisfies specific relations with the level ratio EN_SN and the level ratio difference DIF_SN. More specifically, as shown in FIG. 4, a threshold TH is set so that the accuracy of authentication satisfies a specific condition (for example, so that the FRR and the FAR are each lower than a specific level) for each case where the value of the level ratio EN_SN (which is the ratio between the registration noise and the registration voice) is changed to a new value and then the threshold TH on the vertical axis is plotted versus each corresponding level ratio EN_SN on the horizontal axis. When the plotted points are statistically processed, they tend to be distributed along a line according to the level ratio difference DIF_SN. For example, when the level ratio difference DIF_SN is set to a value DIF_SN1, a threshold TH, which satisfies a desired condition, changes with the level ratio EN_SN along a line having attributes such as gradient and intercept corresponding to the value DIF_SN1. In addition, as shown in FIG. 4, the threshold TH for maintaining the authentication accuracy at a desired level increases as the level ratio EN_SN or the level ratio difference DIF_SN (DIF_SN1>DIF_SN2>DIF_SN3) increases.

Accordingly, the authentication can be maintained at a desired accuracy level if a threshold TH is set for the level ratio EN_SN calculated at step S10 so that the threshold TH and the level ratio EN_SN satisfy the relation of a line corresponding to the level ratio difference DIF_SN calculated at step S12. For example, in the case where the level ratio EN_SN is calculated to be a value SNa in FIG. 4, the threshold TH is set to THa if the level ratio difference DIF_SN is DIF_SN1 and is set to THb if the level ratio difference DIF_SN is DIF_SN2.

Since whether the distance is greater or smaller than the threshold is determined during authentication, a process for changing the threshold TH to be compared with the distance D0 by a specific value is equivalent to a process for correcting the distance D0 by the specific value Aa with the threshold TH fixed to TH0. Accordingly, the setter 51 of this embodiment sets, as the correction value Aa, the difference between the predetermined threshold TH0 and the threshold TH which satisfies the relation of a line, which corresponds to the level ratio difference DIF_SN, with the level ratio EN_SN. That is, for example, when the level ratio EN_SN is calculated to be a value SNa at step S10, as shown in FIG. 4, the difference a1 between the threshold TH0 and a value THa is set as the correction value Aa if the level ratio difference DIF_SN is calculated to be DIF_SN1 at step S12 and the difference a2 between the threshold TH0 and a value THb is set as the correction value Aa if the level ratio difference DIF_SN is calculated to be DIF_SN2 at step S12. A distance D1 calculated by subtracting the correction value Aa set in this manner from the distance D0 is compared with the threshold TH0 at the determinator 46, thereby maintaining the authentication of this embodiment at a desired accuracy level.

Figure 5:
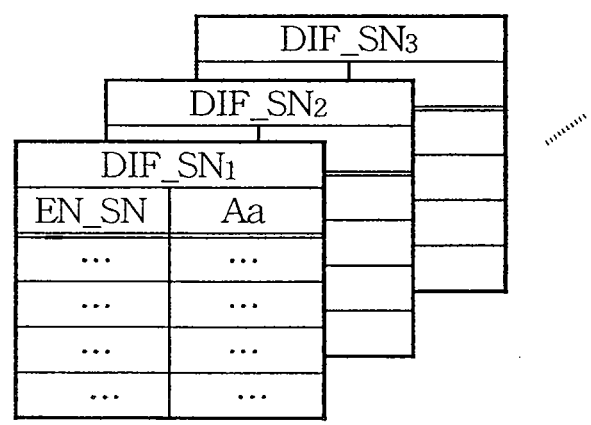
FIG. 5 is a conceptual diagram illustrating the contents of tables used to determine the correction value Aa.

More specifically, the setter 51 of this embodiment determines the correction value Aa from the level ratio EN_SN and the level ratio difference DIF_SN based on a table that has been created so as to satisfy the above condition. FIG. 5 is a conceptual diagram illustrating the contents of tables used at step S14. As shown in FIG. 5, a plurality of tables corresponding to different level ratio differences DIF_SN (DIF_SN1, DIF_SN2, DIF_SN3, . . . ) are stored in the storage unit 35. In each table, each level ratio EN_SN is associated with a corresponding correction value Aa which satisfies the relation of FIG. 4 with the level ratio EN_SN. That is, in a table corresponding to a level ratio difference DIF_SN, each level ratio EN_SN is associated with a corresponding correction value Aa such that a threshold TH obtained by adding the correction value Aa to the threshold TH0 has the relation of a line, corresponding to the level ratio difference DIF_SN, with the level ratio EN_SN.

At step S14, the setter 51 searches for a table corresponding to the level ratio difference DIF_SN calculated at step S12 and outputs a correction value Aa corresponding to the level ratio EN_SN calculated at step S10 which is included in the retrieved table to the corrector 44. If no table corresponding to the level ratio difference DIF_SN calculated at step S12 is present, the setter 51 specifies correction values Aa according to the level ratio EN_SN from tables corresponding to level ratio differences DIF_SN prior to and subsequent to the calculated level ratio difference DIF_SN and calculates a correction value Aa, which is to be actually applied to correction of the corrector 44, by interpolating between the specified correction values Aa. Accordingly, for example, if the level ratio difference DIF_SN is calculated to be a mean of the value DIF_SN1 and the value DIF_SN2 of FIG. 2 at step S12, the correction value Aa is calculated to be a mean of a correction value Aa (value a1) corresponding to the value DIF_SN1 and a correction value Aa (value a2) corresponding to the value DIF_SN2.

However, the relations of the threshold TH with the level ratio EN_SN and the level ratio difference DIF_SN are determined, for example under the assumption that the characteristics of registration noise are identical to those of authentication noise. However, in many cases, the characteristics of registration noise are different from those of authentication noise. Accordingly, the setter 52 calculates a correction value Ab to correct the distance D0 according to a correlation value NOISE_DIF between the registration noise and the authentication noise (step S15). The corrector 44 subtracts the correction value Ab from the distance D0.

Figure 6:
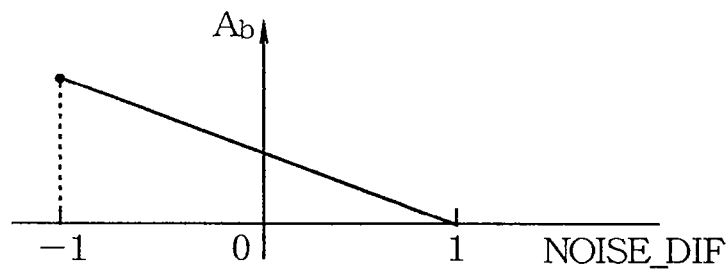
FIG. 6 is a graph illustrating the relation between a correlation value NOISE_DIF and a correction value Ab.

FIG. 6 is a graph illustrating the relation between the correlation value NOISE_DIF and the correction value Ab. The correlation value NOISE_DIF calculated using Equation (3) varies within a range from "−1" to "1" according to the correlation between registration noise and authentication noise. The correlation value NOISE_DIF is "1" when the characteristics of the two noises are exactly identical. It is not necessary to correct the distance D0 according to the correlation value NOISE_DIF if when the relation between the registration noise and the authentication noise is equivalent to that when the relations of FIG. 4 are determined (if the two noises are identical in this embodiment). The distance D0 must be corrected more greatly as the relation between the registration noise and the authentication noise is more different from that when the relations of FIG. 4 are determined. Accordingly, the setter 52 sets the correction value Ab to zero (i.e., does not correct the distance D0) when the correlation value NOISE_DIF is "1" and sets the correction value Ab higher as the correlation value NOISE_DIF decreases below "1". More specifically, the storage unit 35 stores a table, in which each correlation value NOISE_DIF is associated with a corresponding correction value Aa which satisfies such a relation with the correlation value NOISE_DIF, and the setter 52 determines the correction value Ab based on this table.

In addition, the relation of the threshold TH with the level ratio EN_SN and the level ratio difference DIF_SN shown in FIG. 4 is determined, for example based on data collected when a registration voice is spoken continuously during a specific duration (time length) L0. However, the speech lengths EN_SPEECH_LEN of registration voices in actual initial registration are different. Accordingly, the setter 53 calculates a correction value Ac to correct the distance D0 according to the speech length EN_SPEECH_LEN (step S16). The corrector 44 subtracts the correction value Ac from the distance D0.

Figure 7:
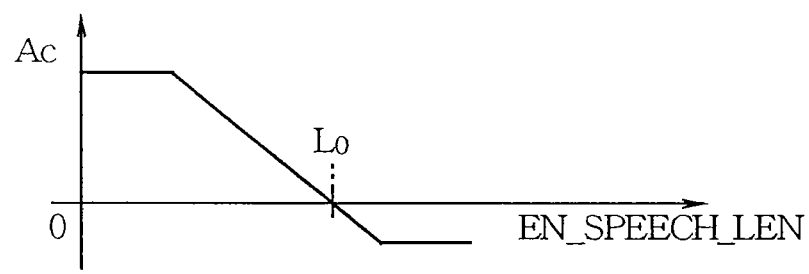
FIG. 7 is a graph illustrating the relation between a speech length EN_SPEECH_LEN and a correction value Ac.
Figure 8:
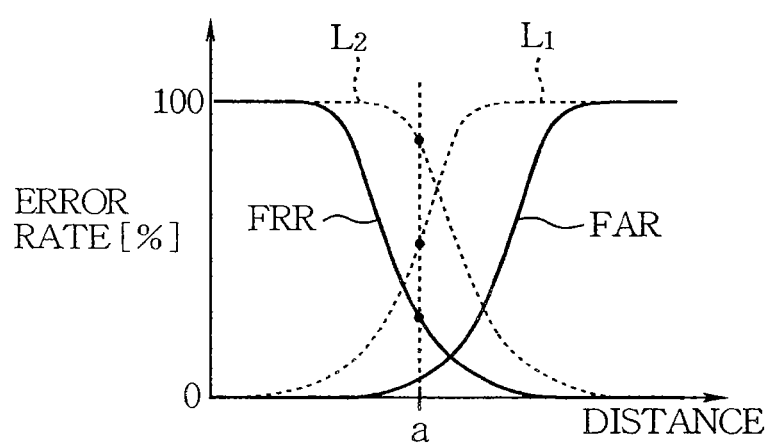
FIG. 8 is a graph illustrating the relation of a threshold with FAR and FRR.

FIG. 7 is a graph showing the relation between the speech length EN_SPEECH_LEN and the correction value Ac. It is not necessary to correct the distance D0 according to the speech length EN_SPEECH_LEN if the speech length EN_SPEECH_LEN is identical to the duration L0 when the relation of FIG. 4 is determined. Accordingly, the setter 53 sets the correction value Ac to "0" if the speech length EN_SPEECH_LEN stored in the storage unit 32 is identical to the duration L0. As the speech length EN_SPEECH_LEN increases, the speech of the registration voice is more stable so that the feature quantity EN_DATA more reliably reflects the inherent, basic characteristics of the authorized user, thereby increasing the accuracy of the distance D0. Accordingly, the possibility of rejecting the authorized user is not unduly increased even if the threshold TH0 is lowered relative to the distance D0 in order to reduce the possibility that the authenticity of a stranger will be accepted.

Therefore, the setter 53 selects, as the correction value Ac, a negative value according to the speech length EN_SPEECH_LEN if the speech length EN_SPEECH_LEN is greater than the duration L0. Since the corrector 44 subtracts the correction value Ac from the distance D0, the corrected distance D1 is greater than the distance D0 if the correction value Ac is negative. That is, the possibility that the authenticity of a stranger will be erroneously accepted is reduced since the threshold TH0 is reduced relative to the distance D0. On the contrary, the setter 53 selects, as the correction value Ac, a positive value according to the speech length EN_SPEECH_LEN if the speech length EN_SPEECH_LEN is smaller than the duration L0. The setter 53 determines the correction value Ac, for example based on a table in which each speech length EN_SPEECH_LEN is associated with a corresponding correction value Ac.

As described above, in this embodiment, authentication can be maintained at a desired accuracy level regardless of the characteristics of authentication noise or registration noise since the distance D0 is corrected according to the relation between the authentication noise and the authentication voice (V_SN) or the relation between the registration noise and the registration voice (EN_SN). That is, both the increase of convenience (the reduction of FRR) and the increase in the accuracy of authentication (the reduction of FAR) can be achieved without being affected by authentication noise or registration noise.

In this embodiment, especially, the correction value Aa is adjusted based on the knowledge that the threshold TH and the level ratio EN_SN which satisfy a desired condition are in the relation of a line corresponding to the level ratio difference DIF_SN. Thus, this embodiment has an advantage in that it is possible to specify the optimal correction value Aa with high accuracy while sufficiently reducing the number of variables required to set the correction value Aa. It is also possible to realize highly accurate authentication by fully considering environments of the voice authentication apparatus 100 in initial registration or authentication since the distance D0 is corrected according to the correlation value NOISE_DIF or the speech length EN_SPEECH_LEN.

<C: Modified Embodiments>

The above embodiments may be modified in various ways. The following illustrates specific modified embodiments. Appropriate combinations of the following modified embodiments are also possible.

(1) Modified Embodiment 1

Although the configurations illustrated in the above embodiments use tables stored in the storage unit 35, configurations, which calculate correction values A (Aa, Ab, and Ac) through computation processes using predetermined equations, are also possible. For example, the storage unit 35 stores a plurality of formulas respectively representing lines (i.e., the lines of FIG. 4, each defining the relation between the level ratio EN_SN and the threshold TH) according to level ratio differences (DIF_SN) and the setter 51 calculates a threshold TH by substituting the level ratio EN_SN calculated at step S10 into an equation according to the level ratio difference DIF_SN calculated at step S12 and calculates a correction value Aa by subtracting the threshold TH0 from the calculated threshold TH. This example also employs a configuration in which the setter 52 calculates a correction value Ab based on an equation representing the relation between the correlation value NOIS_DIF and the correction value Ab or a configuration in which the setter 53 calculates a correction value Ac based on an equation representing the relation between the speech length EN_SPEECH_LEN and the correction value Ac.

(2) Modified Embodiment 2

Variables that determine the extent to which the distance D0 is corrected are not limited to the correlation value NOIS_DIF and the speech length EN_SPEECH_LEN. For example, a configuration that calculates the correction value Ab according to the speech length V_SPEECH_LEN of the authentication voice or a configuration that calculates the correction value Ab according to the average of the speech length EN_SPEECH_LEN and the speech length V_SPEECH_LEN may be employed instead of or in conjunction with the configuration which sets the correction value Ab according to the speech length EN_SPEECH_LEN. For example, the correction value Ab is set such that the corrected distance D1 increases as the speech length V_SPEECH_LEN increases, similar to the relation between the correction value Ab and the speech length EN_SPEECH_LEN.

Configurations in which the correction value controller 50 determines each correction value based on variables other than those described above are also employed. For example, each correction value may be set according to the ratio between the durations of voiced and unvoiced sounds included in the registration voice or the authentication voice (in the spoken section P2). As the ratio of the voiced sound increases, the values of the feature quantities EN_DATA and V_DATA more reliably reflect the characteristics of the speaker, thereby increasing the accuracy of the distance D0. Accordingly, the FRR is not unduly increased even if the distance D1 is increased from the distance D0. Thus, a configuration in which each correction value is set such that the distance D1 increases as the ratio of the voiced sound in the registration voice or the authentication voice increases is employed. In addition, a configuration in which each correction value is set such that the distance D1 increases as the number of syllables of the registration voice or the authentication voice increases may also be employed since the accuracy of the distance D0 increases as the number of syllables of the registration voice or the authentication voice increases.

(3) Modified Embodiment 3

Configurations in which the relations between the variables and the correction values are variable are also employed. For example, a configuration in which the relation of the correction value Aa with the level ratio EN_SN or the level ratio difference DIF_SN is changed by updating the table according to a manipulation of the operating unit 10 may be provided. Similarly, the correction value Ab corresponding to the correlation value NOISE_DIF or the correction value Ac corresponding to the speech length EN_SPEECH_LEN may be modified according to a manipulation of the operating unit 10. These configurations can achieve authentication according to desires of the user. In the configuration in which the correction values A (Aa, Ab, and Ac) are calculated through computation of equations as illustrated in Modified Embodiment 1, the contents (for example, the coefficients of variables) of each of the equations may be modified according to a manipulation of the operating unit 10.

(4) Modified Embodiment 4

Although the configurations illustrated in the above embodiments use the distance D0 (the corrected distance D1) in authentication, the value indicating the similarity between the registration voice and the authentication voice is not limited to the distance D0. For example, a configuration which performs authentication based on any variable (i.e., any index value), the value of which increases as the characteristics of the registration voice and those of the authentication voice approach each other, is employed. In this configuration, the increase or decrease in the correction values A (Aa, Ab, and Ac) according to each variable is reversed compared to the above embodiments. For example, contrary to the configuration of FIG. 4, the correction value Aa in this configuration decreases as the level ratio EN_SN increases. p (5) Modified Embodiment 5

Although the three types of correction values Aa, Ab, and Ac are individually output to the corrector 44 in the configurations illustrated in the above embodiments, a configuration in which the correction value controller 50 outputs the sum of the correction values Aa, Ab, and Ac to the corrector 44 may also be employed. In addition, computation operations of the corrector 44 to correct the distance D0 are appropriately modified. For example, a configuration in which the corrector 44 adds each correction value A (Aa, Ab, and Ac) to the distance D0 or multiplies the distance D0 by each correction value A (Aa, Ab, and Ac) is employed. In the configuration in which the distance D1 is calculated by adding each correction value A to the distance D0, the sign of each correction value A is reversed compared to the configuration of FIG. 1.

(6) Modified Embodiment 6

Although the configurations illustrated in the above embodiments calculate, as the correction value Aa, the difference between the predetermined threshold TH0 and the variable (threshold) TH that varies linearly with the level ratio EN_SN, the relation between the level ratio EN_SN and the threshold TH is changed appropriately. For example, this modified embodiment employs a configuration in which thresholds TH are specified according to the level ratio EN_SN and the level ratio difference DIF_SN so that the level ratio EN_SN and the threshold TH satisfy the relation of a curve corresponding to the level ratio difference DIF_SN (i.e., so that the threshold TH changes with the level ratio EN_SN along a curve corresponding to the level ratio difference DIF_SN) and the difference between the threshold TH and the threshold TH0 is determined to be the correction value Aa. It will suffice to set the threshold TH so that the threshold TH and the level ratio EN_SN have a different relation according to the authentication noise (typically, a linear or curvilinear relation according to the level ratio difference DIF_SN) as described above. A specific relation between the level ratio EN_SN and the threshold TH corresponding to one level ratio difference DIF_SN is changed appropriately, for example, according to the result of a test to derive a relation between such variables or according to a statistically processed result of the test result. Accordingly, a correction value Aa in a preferred embodiment of the present invention is determined to be the difference between a predetermined threshold TH0 and a threshold TH which satisfies a relation according to authentication noise with the level ratio EN_SN.

(7) Modified Embodiment 7

Although the cases where the voice authentication apparatus 100 is used to distinguish between an authorized user and a stranger are illustrated in the above embodiments, the voice authentication apparatus 100 according to the above embodiments may also be used for voice password authentication which determines whether or not a password specified by an authentication voice matches a password previously registered based on speech of the authorized user.

The invention claimed is:

1. A voice authentication apparatus comprising:
hardware circuitry having:
a characteristics analysis part that analyzes characteristics of a sample noise which is generated around a subject while the subject generates a sample voice for authentication of the subject;
a first setting part that sets a first correction value according to a first relation between the sample voice and the sample noise analyzed by the characteristics analysis part and a second relation between a reference voice which has been previously registered and a reference noise which is generated during registration of the reference voice, such that the first correction value is set according to both a level ratio between the reference voice and the reference noise and a level ratio difference between the level ratio between the reference voice and the reference noise and a level ratio between the sample voice and the sample noise;
a correction part that corrects an index value, which indicates a degree of similarity between a feature quantity of the reference voice and a feature quantity of the sample voice obtained from the subject, based on the first correction value set by the first setting part; and
a determinator that determines authenticity of the subject by comparing the index value corrected by the correction part with a predetermined threshold value.

2. The voice authentication apparatus according to claim 1, wherein the first setting part sets the first correction value as a difference between the predetermined threshold value and a variable which is determined in association with both the level ratio between the reference voice and the reference noise and the level ratio difference between the level ratio between the reference voice and the reference noise and a level ratio between the sample voice and the sample noise.

3. The voice authentication apparatus according to claim 2, wherein the first setting part sets the first correction value as the difference between the predetermined threshold value and the variable which varies with the level ratio between the reference voice and the reference noise along a line or curve corresponding to the level ratio difference between the level ratio between the reference voice and the reference noise and a level ratio between the sample voice and the sample noise.

4. The voice authentication apparatus according to claim 2, further comprising a second setting part that sets a second correction value according to a correlation between the sample noise and the reference noise, wherein the correction part corrects the index value according to the first and second correction values.

5. The voice authentication apparatus according to claim 1, further comprising a third setting part that sets a third correction value according to a duration of the sample voice or the reference voice,
wherein the correction part corrects the index value according to the first and third correction values.

6. The voice authentication apparatus according to claim 1, wherein the first setting part searches for a table corresponding to the level ratio difference.

7. The voice authentication apparatus according to claim 6, wherein the first setting part sets the first correction value based on the table, wherein the level ratio between the reference voice and the reference noise is associated, in the table, with the first correction value.

8. A voice authentication method comprising:
analyzing characteristics of a sample noise which is generated around a subject while the subject generates a sample voice for authentication of the subject;
setting a correction value according to a first relation between the sample voice and the sample noise, the characteristics of which are analyzed, and a second relation between a reference voice which has been previously registered and a reference noise which is generated during registration of the reference voice, such that the correction value is set according to both a level ratio between the reference voice and the reference noise and a level ratio difference between the level ratio between the reference voice and the reference noise and a level ratio between the sample voice and the sample noise;
correcting an index value, which indicates a degree of similarity between a feature quantity of the reference voice and a feature quantity of the sample voice obtained from the subject, based on the set correction value; and
determining authenticity of the subject by comparing the corrected index value with a predetermined threshold value.

9. The voice authentication method according to claim 8, further comprising searching for a table corresponding to the level ratio difference.

10. The voice authentication method according to claim 9, wherein setting the correction value is based on the table, wherein the level ratio between the reference voice and the reference noise is associated, in the table, with the correction value.

11. A non-transitory machine readable medium for use in a computer, the medium containing program instructions executable by the computer to perform:
a characteristics analysis process to analyze characteristics of a sample noise which is generated around a subject while the subject generates a sample voice for authentication of the subject;
a setting process to set a correction value according to a first relation between the sample voice and the sample noise analyzed in the characteristics analysis process and a second relation between a reference voice which has been previously registered and a reference noise which is generated during registration of the reference voice, such that the correction value is set according to both a level ratio between the reference voice and the reference noise and a level ratio difference between the level ratio between the reference voice and the reference noise and a level ratio between the sample voice and the sample noise;
a correction process to correct an index value, which indicates a degree of similarity between a feature quantity of the reference voice and a feature quantity of the sample voice obtained from the subject, based on the correction value set in the setting process; and
a determination process to determine authenticity of the subject by comparing the corrected index value with a predetermined threshold value.

12. The non-transitory machine readable medium according to claim 11, wherein the setting process includes searching for a table corresponding to the level ratio difference.

13. The non-transitory machine readable medium according to claim 12, wherein the setting process sets the correction value based on the table, wherein the level ratio between the reference voice and the reference noise is associated, in the table, with the correction value.

* * * * *